United States Patent [19]

Taylor et al.

[11] Patent Number: 5,048,210

[45] Date of Patent: Sep. 17, 1991

[54] DEVICE FOR ILLUMINATING RESIDENCE INFORMATION

[75] Inventors: Stephen Taylor, Tallmadge; Philip Ross, Kent, both of Ohio

[73] Assignee: Adjusta-Post Manufacturing Co., Norton, Ohio

[21] Appl. No.: 475,678

[22] Filed: Feb. 5, 1990

[51] Int. Cl.⁵ ............................................. G09F 13/04
[52] U.S. Cl. ........................................ 40/575; 40/564; 403/260
[58] Field of Search ................. 40/575, 572, 574, 576, 40/607, 564, 568, 570, 571, 541, 617; 248/218.4, 219.3; 362/812; 403/260, 261, 264, 252

[56] References Cited

U.S. PATENT DOCUMENTS

| | | | |
|---|---|---|---|
| 991,867 | 5/1911 | Mathews | 40/607 |
| 1,603,311 | 10/1926 | Brett et al. | 40/607 |
| 1,612,645 | 12/1926 | Nooe | 40/572 |
| 2,693,657 | 11/1954 | Dwinell | 40/574 |
| 3,414,999 | 12/1968 | Mason | 40/576 |
| 3,516,187 | 6/1970 | Espinosa | 40/574 |
| 3,519,292 | 7/1970 | Krikorian | 403/260 |
| 3,959,645 | 5/1976 | Patry | 248/219.3 |
| 4,373,284 | 2/1983 | Crane | 40/576 |
| 4,587,755 | 5/1986 | Sunshine | 40/571 |
| 4,848,017 | 7/1989 | Bailey et al. | 40/576 |
| 4,854,062 | 8/1989 | Bayo | 40/551 |
| 4,937,499 | 6/1990 | Hunte | 40/568 |

FOREIGN PATENT DOCUMENTS

| | | | |
|---|---|---|---|
| 586155 | 11/1959 | Canada | 40/576 |
| 2612577 | 9/1988 | France | 403/260 |

Primary Examiner—Kenneth J. Dorner
Assistant Examiner—Brian K. Green
Attorney, Agent, or Firm—Oldham & Oldham Co.

[57] ABSTRACT

A device for illuminating residence information. More specifically, it relates to a device which can be quickly and easily installed on a new or existing vertical lamppost and connected to a power supply for illuminating the resident's name and/or street number.

11 Claims, 6 Drawing Sheets

DEVICE FOR ILLUMINATING RESIDENCE INFORMATION

TECHNICAL FIELD

The present invention relates to a device for illuminating residence information. More specifically it relates to a device installed on a business or residence vertical exterior lamppost and connected to a power supply for illuminating the resident's name and/or street number.

DISCUSSION OF THE PRIOR ART

Virtually every home and business in the urban United States is identified using a street number. Rural homes may be identified using a house number or simply the resident's last name. People display such residence information using countless ways and in many different locations on their property. Such information may be displayed on or near the front door, on the mailbox or on a lamppost as well as other locations. The numbers or letters used to display such information may be painted, stenciled or formed using symbols made from wood, hard plastic or vinyl, to name a few.

One drawback to the manner in which many people currently display this information is that most are difficult, if not impossible, to see in the dark. The numbers and letters are often made of or painted using dark colors. Others displayed on the actual building or house are too small to be seen from a distance. Almost everyone at one time or another has had to search for an unfamiliar address in the dark. Messenger services, delivery persons, letter carriers, as well as police, fire and rescue personnel face this problem daily.

Currently, several types of illuminated building or house number assemblies are known. U.S. Pat. No. 4,854,062 to Bayo discloses an illuminated house number device connected to the contacts of a doorbell switch. This device, therefore, must be installed in close proximity to the doorbell and is illuminated only upon engaging the doorbell switch. U.S. Pat. No. 4,848,017 to Bailey discloses an illuminated building number assembly. This device discloses a box-like structure containing a fluorescent light fixture. The front panel of this device is formed with slots so as to receive flat translucent number plates. Such a device, because of its single viewing panel, must normally be mounted on the front of the building.

SUMMARY OF THE INVENTION

The present invention provides a novel device for illuminating a resident's name and/or street number. The device is designed to be quickly and easily installed on new or existing exterior lampposts generally using nothing more than a common screwdriver. The device is further designed to utilize the lamppost's existing electrical wiring and when installed provides a clear display of pertinent information in two directions both day and night.

It is an object of the present invention to provide a device for illuminating residence information such that the information is clearly displayed both day and night.

It is a further object of the present invention to provide a device for illuminating residence information which can be easily installed into new or existing lampposts.

It is a further object of the present invention to provide a device which can utilize the existing wiring for supplying power to the device.

It is a further object of the present invention to provide a device which can clearly illuminate residence information that can be viewed easily in two opposing directions.

It is a further object of the present invention to provide a device such that the user can individualize the information displayed on such a device.

It is a further object of the present invention to provide a device which is relatively resistent to the natural elements.

These and other objects and advantages of the present invention will become more readily apparent from the more detailed description of preferred embodiments taken in conjunction with the drawings wherein similar elements are identified by like numerals through several views. Such objects and advantages are achieved by a device for illuminating residence information comprising: a housing of molded, hard, opaque material having an essentially elongated and inverted, "U" shape in longitudinal cross section and having an inner and an outer surface and further comprising a top section, two end walls, and being open on the bottom and two sides; a means for illuminating said device mounted on the inner surface of housing; a means for connecting said illuminating means to a source of energy; a lens further comprising at least one piece of molded, translucent hard plastic material and having a modified "U" shape in transverse cross-section, said lens being removably mounted onto said housing; and a means for mounting said device onto a vertical support structure, said structure having a cross-arm hole.

BRIEF DESCRIPTION OF THE DRAWINGS

In order to better understand the present invention, reference is made to the accompanying drawings, wherein.

DETAILED DESCRIPTION OF THE PREFERRED EMBODIMENT

Figure 1:
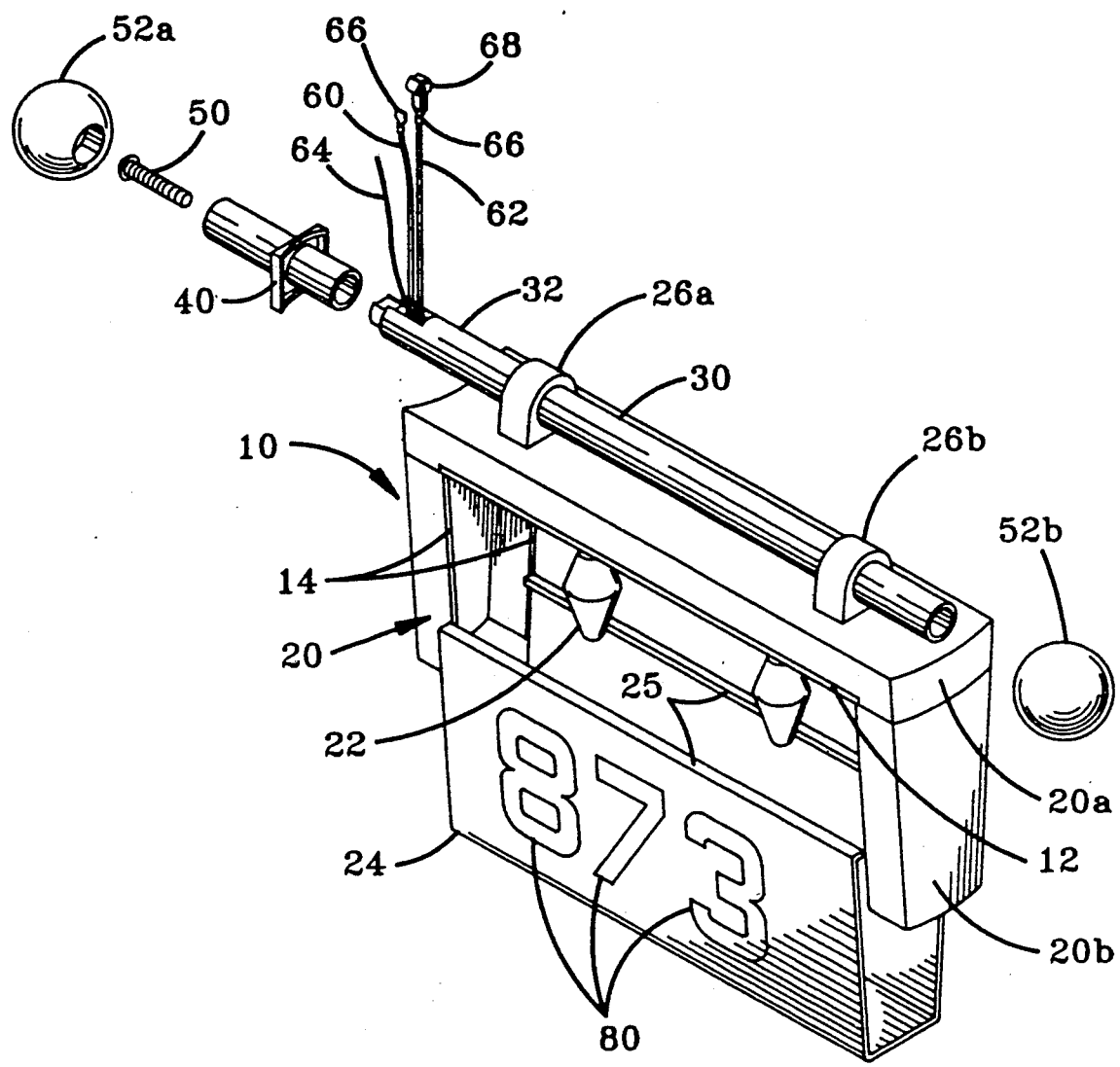
FIG. 1 is an exploded view of a device for illuminating residence information wherein the lens has been partially removed for purposes of illustration.

This invention will be described in detail with reference to the preferred embodiment thereof. Like elements are identified by like reference numerals throughout the drawings and specification.

Figure 6:
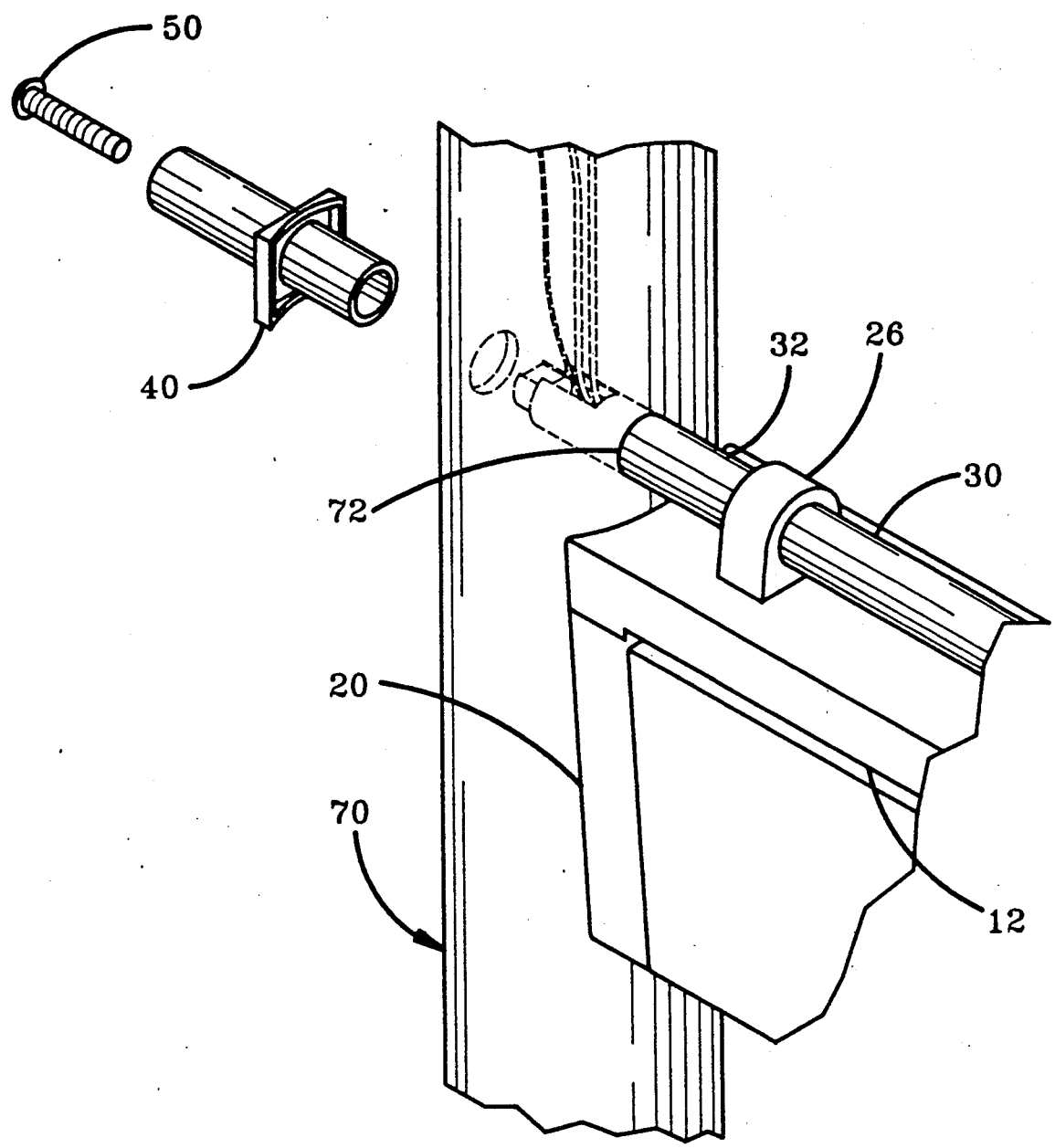
FIG. 6 is a plan view of the device for illuminating residence-information as it is installed onto a lamppost.

Now, with reference to FIG. 1, the device 10 for illuminating residence information according to the present invention comprises a hollow housing 20, a translucent lens 24, a cross-arm 30 and related components required for installation. The present invention is designed to be installed on a new or existing vertical, exterior lamppost 70 as shown in FIG. 6. More specifically, the present invention is designed to be used on vertical lampposts having an approximately 3 inch diameter tubular structure. Commonly such lampposts are available with a standard ¾ inch cross-arm hole. The device is intended for simple, quick installation on this type of lamppost with a predrilled cross-arm hole but its use on lampposts with varying diameters of its vertical structure or cross-arm holes is contemplated. The present invention is further designed for simple installation on existing lampposts using the lamppost's current wiring.

The housing 20, the cross-arm 30, the cross-arm extension 32, and the mounting stud 40 are preferably made from weather-resistant molded thermoplastic material such as polycarbonate, acrylonitrile-butadiene-styrene (ABS) polypropylene, and copolymers thereof. However, these components could be composed of various metals, for example lightweight steel or aluminum, or fiberglass. Such components could be made in any number of colors with black being the most commonly preferred color.

Figure 2:
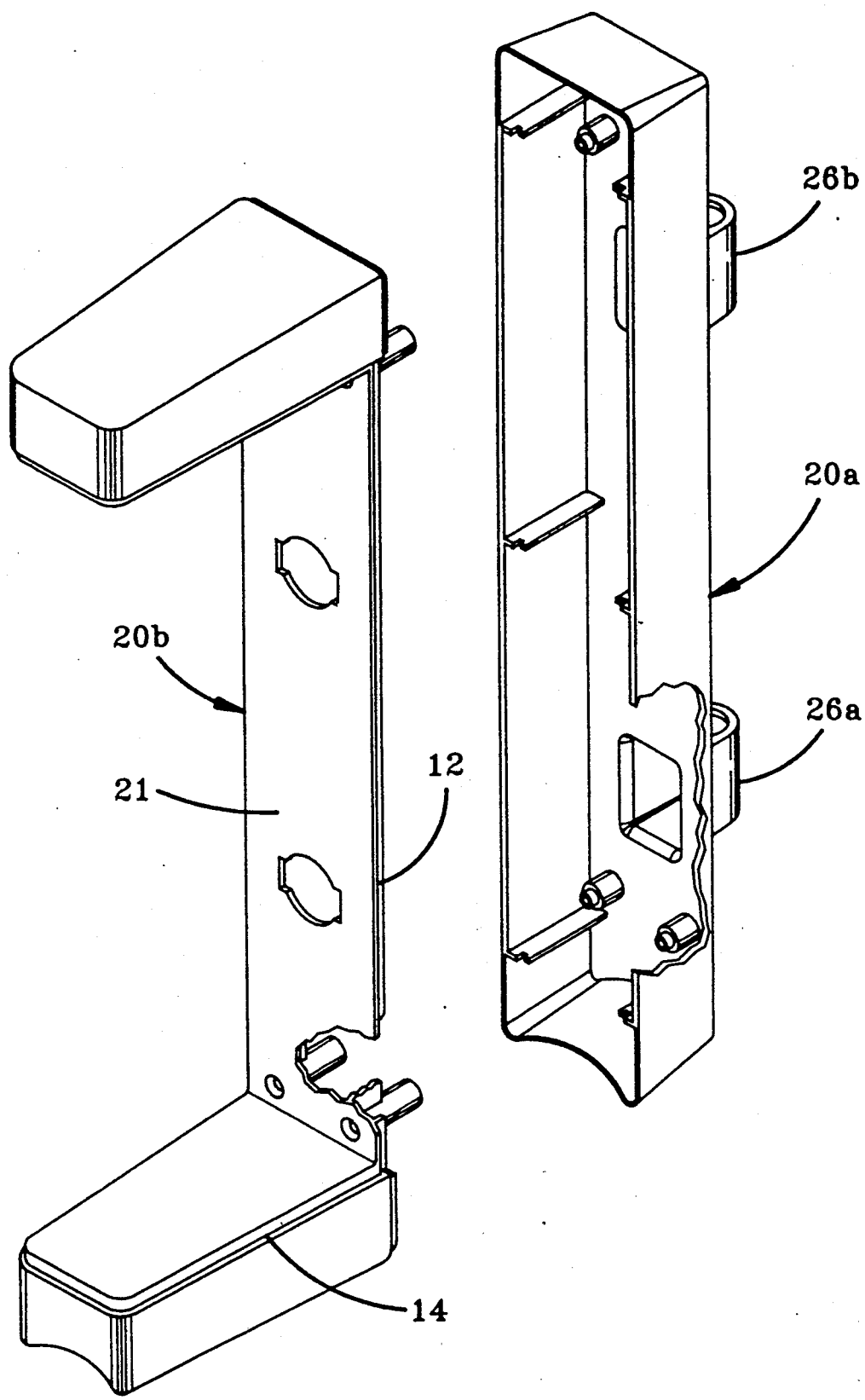
FIG. 2 is an exploded view of the two-part housing for a device for illuminating residence.

The housing 20 is formed by a generally horizontal top section and two end walls extending downward therefrom and is illustrated in FIG. 2. The housing 20 comprises two component pieces 20a and 20b. Component 20a is essentially an elongated hollow box-like structure with one open surface and forms the top portion at housing 20. Component 20b comprises essentially the two end walls connected by a face plate 21. The face plate 21 of the preferred embodiment contains two apertures to allow for the lighting assembly 22. Components 20a and 20b are integrally connected to form housing 20 and held together using screws fastened into receiving ports molded into said plastic. Although such components could be combined using adhesives or other means well-known in the art. One of the end walls is formed with a concave outer surface. This concave surface generally approximates an arc created by the lamppost's circumference. This end wall is intended for placement immediately adjacent to the lamppost 70 for the purpose of providing stability and support to the device 10.

The lighting assembly 22 is shown in the preferred embodiment as being two incandescent bulbs, although fluorescent lighting may be used. The wiring and fixtures are contained within the hollow cavity of component 20a and covered by the face plate when component 20b is attached. The bulbs of lighting assembly 22 project downward through apertures in the face plate. The two bulbs of lighting assembly 22 may be wired either in series or in parallel but are contemplated to operate as a single unit.

Lens 24 protects light assembly 22 and serves as a mounting surface for a plurality of letters and numbers attached thereto. Lens 24 is preferably made from a translucent slightly flexible molded plastic material. Such thermoplastics may include among others, polypropylene, acrylic and polycarbonate. Although not preferred in the present embodiment, other transparent or translucent materials such as glass are contemplated.

Lens 24 in a transverse cross-sectional view presents a modified "U" shape. A flange 25 defines the top of said lens, runs along the length of lens 24 and is directed inward. Lens 24 is installed onto the housing 20 by slightly widening the opening between the top edges of lens 24 and inserting each flange 25 into grooves 12 which are formed between housing components 20a and 20b. Each end of lens 24 rests on a ridge 14 formed on the inner surface of each end wall of component piece 20b.

Cross-arm supports, 26a and 26b are affixed to the outer surface of the top wall of said housing component 20a. The preferred embodiment shows cross-arm supports 26 as molded of the same material and as a part of housing component 20a. This embodiment shows a cross-arm support 26a which has an essentially hollow body and is connected to the hollow portion of housing component 20a. This hollow support 26a enables the wiring of the light assembly 22 to pass from component 20a into the bore of cross-extension 32 discussed below. However, such supports 26a and 26b are contemplated as being formed separately from component 20a and of suitable plastic, metal, or any material commonly known in the art. Such supports 26 may be attached to housing 20 by any common means known in the art. The supports 26, illustrated in the drawings, disclose an inverted "V" shape with aligned circular opening at the ends to receive cross-arm support 30 and/or cross-arm extension 32. Such openings have shapes similar to that of corresponding cross support 30 and having a diameter just slightly greater than said cross-arm 30. FIG. 1 discloses two cross-arm supports 26 although any number and size of supports 26 sufficient to support the weight of the present invention is contemplated.

Cross-arm 30 is shown as having a rod-like shape with a bore cut entirely through its length. The cross-arm 30 is dimensioned so as to be slidably inserted through the openings of cross-supports 26. It is desirable to have a snug friction fit between the cross-arm 30 and corresponding supports in order to prevent the device 10 from swinging freely in the wind.

Figure 4:
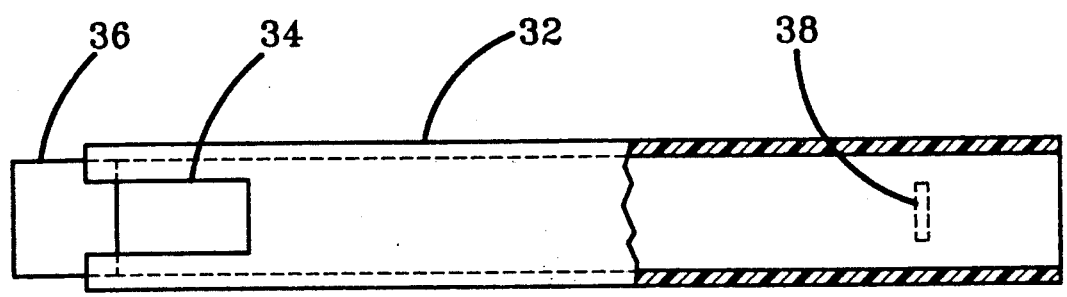
FIG. 4 is an elevational view of a cross-arm extension for a device for illuminating residence information wherein a portion of the cross-arm extension has been cut away for purposes of illustration.

Cross-arm extension 32, as illustrated in FIG. 4, is preferably dimensioned to have approximately the same diameter as cross-arm 30. Cross-arm extension 32 contains a bore cut entirely through its length. Cross-arm extension 32, having a first and second end, has a slot 34 cut in the first end with the slot 34 having one open side. Cross-arm extension 32 is partially inserted into the aperture cut in cross-support 26a and held in place using retaining means 38. If required, any adhesive commonly known in the art can be used to more securely retain said cross-arm 32 in place. In this preferred embodiment cross-arm extension 32 is load bearing while cross-arm 30 just serves to enhance the design and complete the physical appearance of the invention.

In another embodiment, cross-arm piece 30 and cross-arm extension 32 can serve as a single unit wherein the only modification required would be a slot in cross-arm 30 at the point where cross-arm 30 is contained within the aperture of cross-support 26a.

Figure 3:
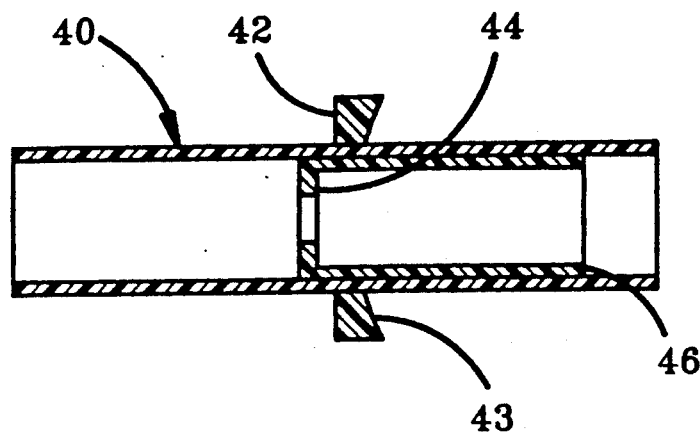
FIG. 3 is a cross-sectional view of a mounting stud for a device for illuminating residence information.

FIG. 3 illustrates a cross-sectional view of mounting stud 40. Mounting stud 40 is an essentially rod-like piece having a bore cut through its entire length. Mounting stud 40 has a first counter bore having a diameter slightly smaller than the original bore, cut therein and which defines inner shelf 46. A second counter bore having a diameter less than either previous bore is cut through mounting stud 40 to form second shelf 44. Mounting stud 40 further comprises a flange 42, circumscribingly formed around the outer surface of said mounting stud 40. This flange 42 is located at approximately the mid-point of said mounting stud 40. This flange 42 has one planar surface perpendicular to the length of said stud 40 and a concave surface 43 on the opposite side. This concave surface 43 conforms to the shape of and is directly adjacent to lamppost 70 when assembled.

Figure 5:
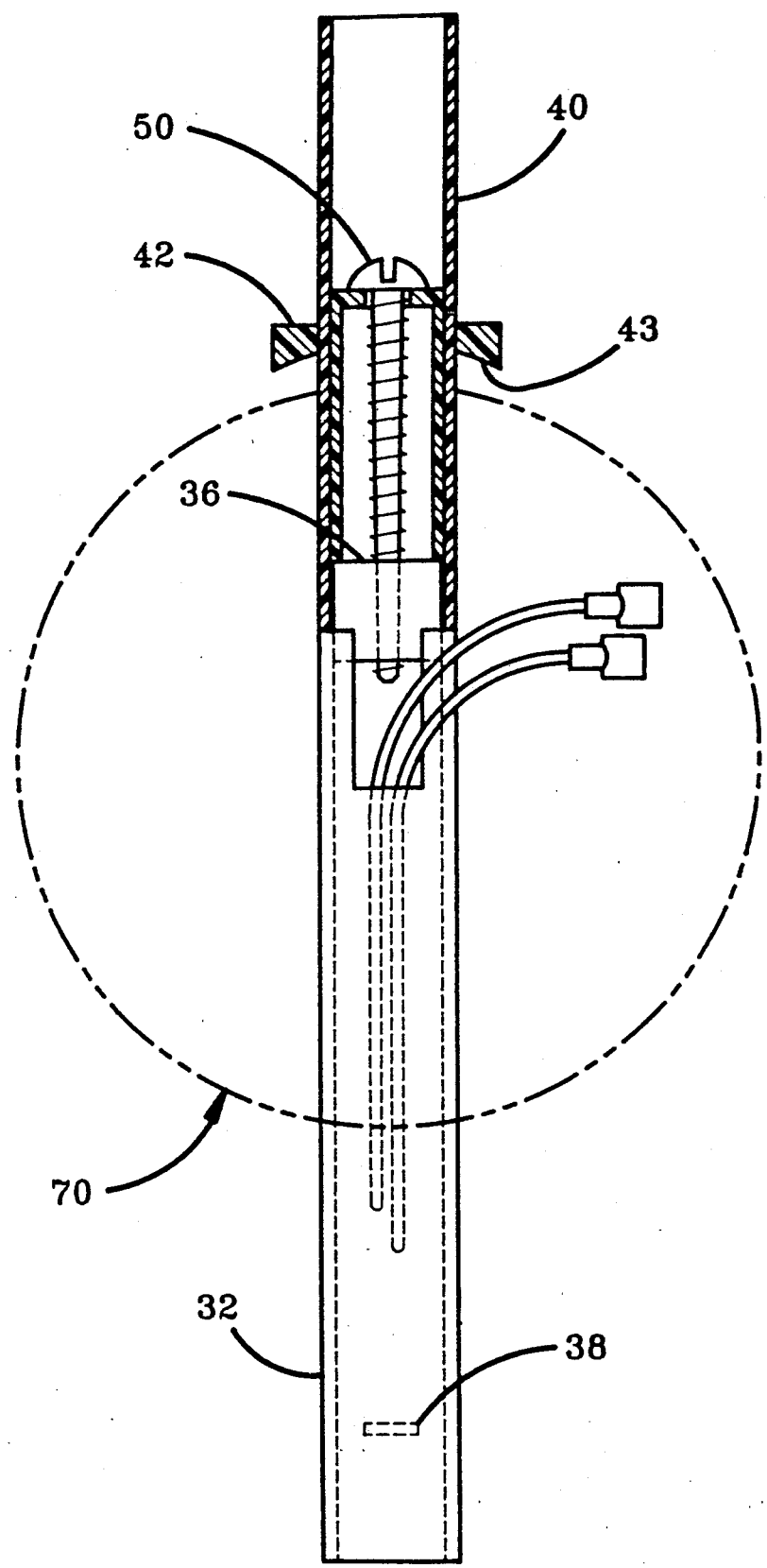
FIG. 5 is a top elevational view of the mounting stud and cross-arm extension assembly for a device for illuminating residence information as installed on a lamppost which is shown in outline for clarity.

The mounting stud 40 and cross arm extension 32 are passed into opposite sides of cross-arm hole 72 of lamppost 70 as shown in FIGS. 5 and 6. Cross-arm 30 is inserted with the slot 34 facing vertically upward. Plug 36 of cross-arm extension 32 is slidably inserted into the bore of mounting stud 40. The plug 36 is inserted until said plug rests on shelf 46. Mounting screw 50 is inserted in the bore of mounting stud 40 and rotatably inserted into an aperture cut in plug 36. The head of mounting screw 50 is prevented from passing through the entire length of mounting stud 40 by shelf 44.

The two electrical wires 60 and 62 and ground wire 64 from the light assembly 22 contained in housing component 20a pass through connected cross-arm support 26a and into the bore of cross-arm extension 32. These wires 60, 62 and 64 are further passed through slot 34 of cross-arm extension 32 and into the center of lamppost 70 through cross-arm hole 72. The electrical wires are designed to be connected with the existing wires 76, 78 and 79, which supply AC power to post top lantern 74.

Figure 7:
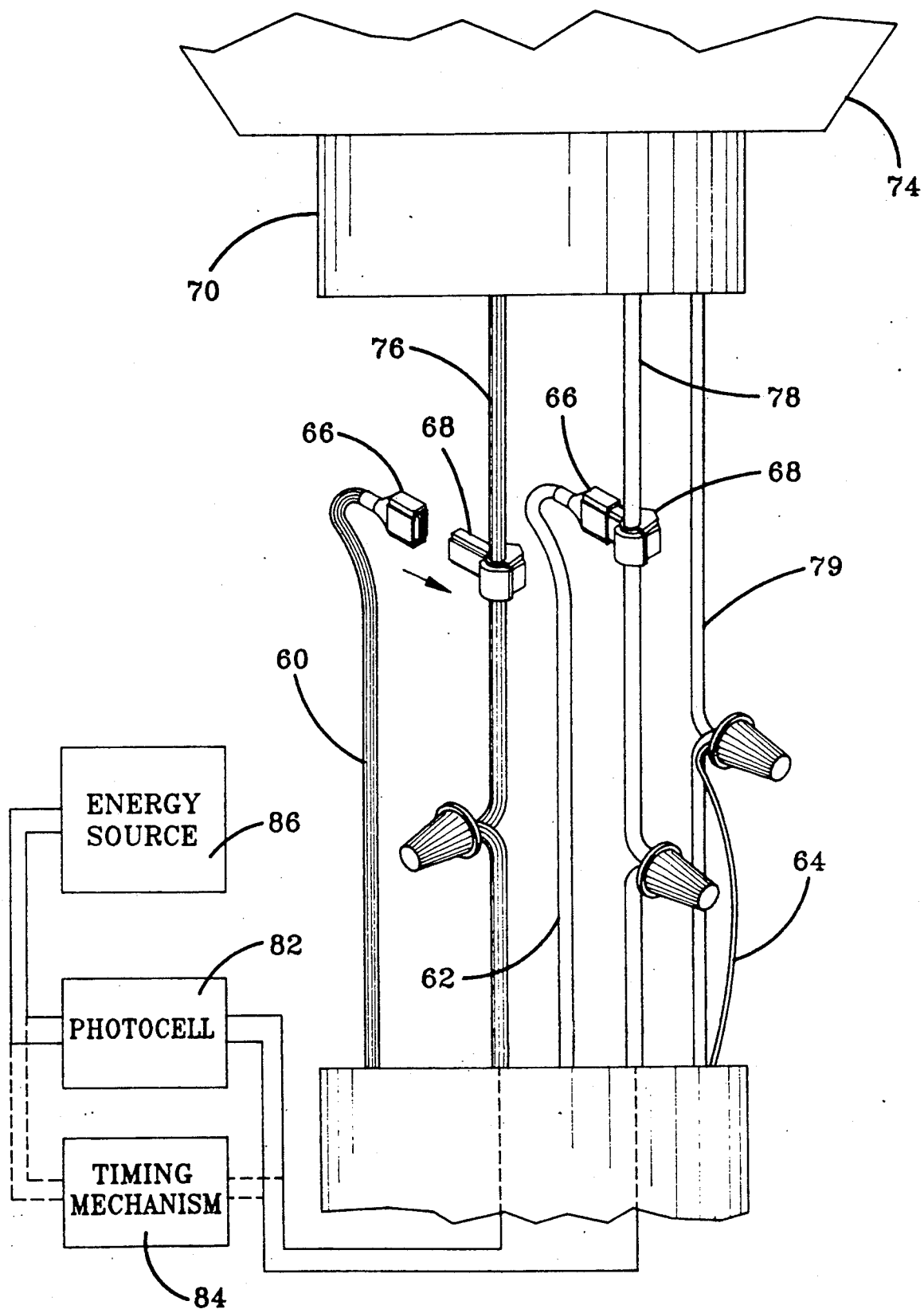
FIG. 7 is a plan view of the electrical wiring connection between a device for illuminating residence information and a lamppost.

Ground wire 64 of device 10 may be connected to post top lantern 74 by any means known in the art. Electrical wires 60 and 62 utilize quick connectors 68 for connection to post top lantern wires 76 and 78. Quick connectors 68 are well-known in the art and generally comprise two portions hingedly connected. One portion contains a means for penetrating the insulation of wire 76 and 78 where said portions are squeezably pressed together. Slide terminals 66 are attached to electrical wires 60 and 62. Such slide terminals are also well known in the art. Each slide terminal of 60 and 62 is slidably entered into the slot of quick connector 68 which is attached to the lamp-top lantern wire of corresponding color. Within quick connector 68, slide terminals 66 connect with the metal penetrating means of quick connector 68. This electrical assembly is clearly set out in FIG. 7.

Device 10 as installed on lamppost 70 according to the method described above, operates on the same AC power switch as post-top lantern 74. This device is also contemplated as being operated manually, by photocell 82, by timing mechanism 84, or any other means known in the art as illustrated diagrammatically in FIG. 7, in conjunction with or independent of the post-top lantern 74. The energy source is contemplated as standard AC current but could be adapted for use with solar energy. The wiring and materials used in this device are in compliance with the current standards of Underwriters Laboratories, Inc.

Cross-arm balls 52a and 52b are shown as essentially spherical in shape and contain a bore cut partially therethrough. This bore has a diameter slightly greater than the diameter of mounting stud 40 or cross-arm 30. Cross-arm balls 52a and 52b are slidably inserted onto the end of either mounting stud 40 or cross-arm 30 and retained with a friction fit. For a more secure fit, 52b can be affixed using any adhesive commonly known in the art.

A supply of numbers and letters are provided with each device. Such numbers and letters, hereinafter referred to as symbols 80, are generally opaque and have a layer of pressure sensitive adhesive disposed on either the front or back surface. Symbols 80 are contemplated as varying in size and letter style. Symbols 80 with a pressure sensitive adhesive disposed on the front surface of each number or letter are affixed to the inside surface of a transparent lens 24. The preferred embodiment illustrated in FIG. 1 shows symbols 80 with pressure sensitive adhesive on the back surface are generally affixed to the outer surface of lens 24, lens 24 being either transparent or translucent.

While in accordance with the patent statutes the best mode and preferred embodiment of the invention has been described, it is to be understood that the invention is not limited thereto, but rather is to be measured by the scope and spirit of the appended claims.

What is claimed is:

1. A device for illuminating residence information comprising:
   a housing of molded, rigid material having an essentially elongated and inverted "U" shape in longitudinal cross section and having an outer surface further comprising a top section, two end walls and being open on a bottom and two sides;
   at least one cross-arm support affixed to the top outer section of said housing and having an opening cut therein;
   a means for illuminating said device mounted on the inner surface of said housing;
   a means for connecting said illuminating means to a source of energy;
   a lens comprising at least one molded, non-opaque material and having a modified "U" shape in transverse cross-section, said lens being removably mounted onto said housing; and
   a means for mounting said device onto a vertical support structure having a cross-arm hole essentially perpendicular to a longitudinal axis of said structure, said mounting means comprising an elongated tubular cross-arm, said cross-arm having a first and a second end and a plug partially inserted in said first end and a mounting stud being substantially tubular and having a first and a second end and a flange on its outer surface,
   wherein said cross-arm engages the aperture of each said cross-arm support and said cross-arm and said mounting stud are inserted into said cross-arm hole in said vertical structure from opposite sides and urged into engagement with one another such that said plug is contained within said mounting stud and retained there by a fastening means.

2. The device as recited in claim 1 wherein said means for illuminating said device comprises at least one fluorescent light bulb.

3. The device as recited in claim 1 wherein said means for illuminating said device comprises at least one incandescent light bulb.

4. The device as recited in claim 1 further comprising a plurality of opaque numbers and letters affixed to said lens of said device.

5. The device as recited in claim 1 wherein said connecting means is a plurality of quick connectors for tapping into an existing power source of said support structure.

6. The device as recited in claim 1 wherein said energy source is regulated by a photocell.

7. The device as recited in claim 1 wherein said energy source is regulated by a timing mechanism.

8. The device as recited in claim 1 wherein said cross-arm serves as a conduit for the passage therethrough of said connecting means between said illuminating means and said energy source and further comprises an open slot at its first end and an aperture in a wall of said cross-arm.

9. The device as recited in claim 1 wherein at least one said cross-arm support possesses an opening connecting said cross-arm aperture to said inner surface of said housing.

10. The device as recited in claim 1 wherein said mounting stud further comprises at least one shelf around a substantial portion of an inner circumference of said stud for supporting said fastening means.

11. The device as recited in claim 10 wherein said fastening means comprises a mounting screw inserted axially into said mounting stud so as to threadably engage said mounting stud and said cross-arm plug.

* * * * *